United States Patent [19]

Strange

[11] 4,053,899
[45] Oct. 11, 1977

[54] ELECTROGRAPHIC RECORDER COVER ASSEMBLY WITH RETRACTABLE ELECTRODES

[75] Inventor: Robert F. Strange, Round Rock, Tex.
[73] Assignee: Bausch & Lomb Incorporated, Rochester, N.Y.
[21] Appl. No.: 673,034
[22] Filed: Apr. 2, 1976
[51] Int. Cl.² .................. G01D 9/00; G01D 15/00
[52] U.S. Cl. .................................. 346/68; 346/145; 346/165
[58] Field of Search ............. 346/145, 68, 155, 165

[56] References Cited

U.S. PATENT DOCUMENTS

| | | | |
|---|---|---|---|
| 2,611,677 | 9/1952 | Alden | 346/165 |
| 2,728,627 | 12/1955 | Alden | 346/165 X |
| 3,545,004 | 12/1970 | Alden | 346/165 |
| 3,638,237 | 1/1972 | Alden | 346/165 X |
| 3,761,952 | 9/1973 | Simpkins | 346/165 |

Primary Examiner—George H. Miller, Jr.
Attorney, Agent, or Firm—Frank C. Parker; Bernard D. Bogdon

[57] ABSTRACT

A recorder segment electrode assembly is pivotably mounted to an access cover of an electrographic recorder in such a manner that the segment electrode assembly is in a first protected and inoperative position when the cover is open. When the cover is closed, the segment electrode assembly is caused to pivot to a second extended and operative position in contact with recording paper.

12 Claims, 3 Drawing Figures

ELECTROGRAPHIC RECORDER COVER ASSEMBLY WITH RETRACTABLE ELECTRODES

BACKGROUND OF THE INVENTION

1. Field of the Invention

This invention relates to an electrographic recorder cover assembly including a segment electrode assembly and a recording medium loading device, and particularly to a segment electrode assembly mounted to a recorder cover to retract to a protected position when the cover is open and to extend to an operative position when the cover is closed.

2. Description of the Prior Art

In the past, segment electrode assemblies in electrographic printers have been mounted in such a way that there was little or no protection against inadvertent damage from outside sources, particularly during loading and unloading of recorder paper. When the segment electrode assembly was left exposed during servicing and maintenance, prior art type printer equipment, including their covers, offered little or no protection to the electrode assembly. The assemblies were easily damaged or knocked out of alignment, particularly since an operator might catch part of his wearing apparel on the electrodes thereby bending them, or otherwise knocking them out of alignment. In many cases the segment electrodes were displayed in such a manner that they could, for instance, be disturbed by the operator while he was attempting some necessary operation, such as loading the recording paper or performing routine maintenance. Any misalignment or damage to the segment electrode assembly generally causes the printout to be defective and, therefore, unacceptable. The present invention, as described herein, has effectively eliminated the problems mentioned above.

Further, print readouts from electrographic printers used in the past have not been uniform in clarity. This, generally, has been caused by a misalignment between the segment electrode and the stylus board. For instance, when the cover of the printer was closed, a segment electrode would not, of itself, find proper angular alignment with the stylus board. The printout was thereby caused to have darker print toward one side and very light print toward the other. The invention described herein also effectively eliminates such problems.

DETAILED DESCRIPTION OF THE PREFERRED EMBODIMENT

Figure 1:
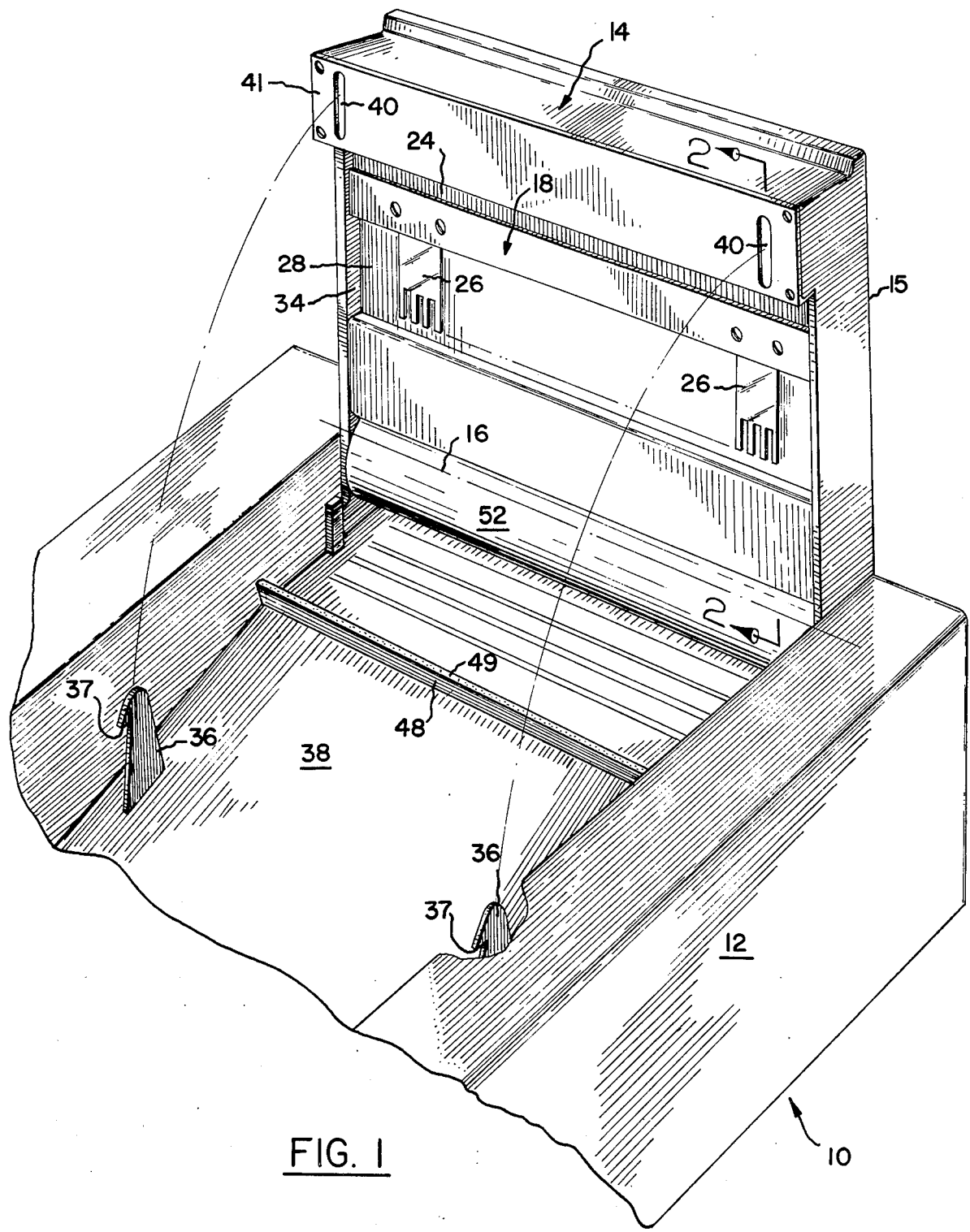
FIG. 1 is a partial perspective view of an electrographic printer with the cover in the open position showing the segment electrode assembly and the paper loading surface according to the principles of this invention.

An electrographic printer 10 is shown in FIG. 1 which consists, essentially, of a main body or base portion 12 and a cover assembly 14. The cover assembly 14 is pivotally engaged to the main body portion 12 about an axis 16 and is pivotable thereabout from a first, or open, position to a second, or closed, position in readiness for printer operation.

Figure 2:
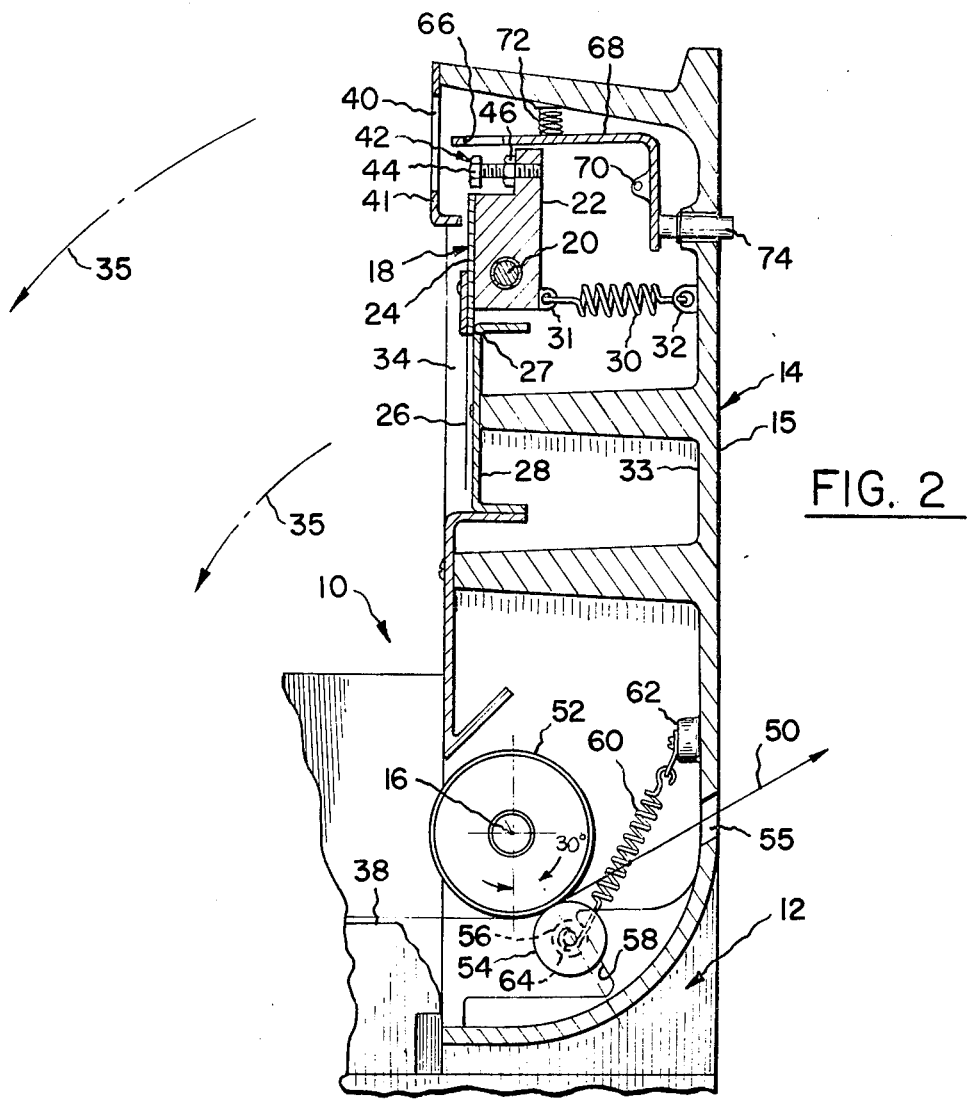
FIG. 2 is a sectional view taken along line 2—2 of FIG. 1.
Figure 3:
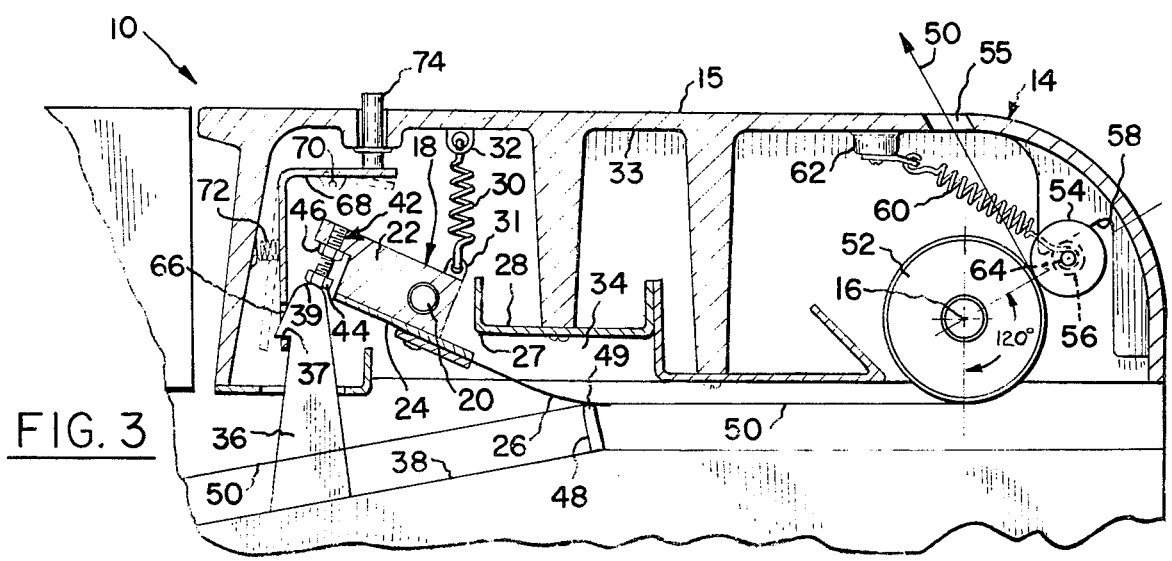
FIG. 3 is a sectional view similar to FIG. 2 showing the cover of the electrographic printer in a closed and operative position.

A segment electrode assembly 18 is pivotally mounted in the cover member 14 about axis pin 20, as best seen in FIGS. 2 and 3, and is essentially comprised of a rigid mounting board 22, a printed circuit driver board 24 mounted thereto and a plurality of segment electrode units 26 which are engaged to the driver board 24 and extend outwardly therefrom. The illustrated and disclosed segment electrode assembly of concurrently filed and copending patent application Ser. No. 673,029 entitled "Electrographic Segment Electrode Clamping Assembly" is satisfactory for application to the present embodiment. The segment electrode units 26 each comprise a plurality of fingers which are, preferably, etched from very thin beryllium copper material. Because of the selected thinness of the copper, the segment electrode fingers 26 are quite flexible, as is required for their operation. Although beryllium copper material is preferred, it will be appreciated that other electrically conductive materials are quite suitable for this purpose. Because of their flexible state, it is important to protect the individual segment fingers 26 from being damaged and bent. If they are damaged, adverse printouts generally result and could, possibly, result in the equipment being rendered inoperative.

When the cover 14 of the electrographic printer 10 is in an open position, as best seen in FIGS. 1 and 2, the segment electrode assembly 18, and specifically the driver board 24 of the segment electrode assembly 18, is held inward and, for example, against a stop surface 27 of a recessed plate 28. This inward position is dictated by, for example, the force from a spring 30 extending from a mount 31 on the board 22 to, for example, a complementing mount 32 on the inside surface 33 of the cover 14. The plurality of segment electrode fingers 26 are, thus, disposed in a protective recessed area 34. This arrangement provides a shelter for the flexible segment electrode fingers of each unit 26 and thereby keeps them from outside disturbances which may cause the segment fingers 26 to be permanently bent, damaged, or otherwise disrupted. For instance, the shirtsleeve of an operator has been known to catch on one of the thin segment fingers when the operator is servicing or working with such an instrument. By providing a recessed area 34 into which the segment fingers 26 may retract, or move, when the cover 14 is open, the possibility of damage thereto is practically eliminated.

A pair of cover latch members 36 protrude upwardly from surface 38 of the main body portion 12 of the printer 10 and are spaced apart a predetermined distance which, at least, is slightly greater than the width of the recording paper being used in the equipment. As the cover member 14 is pivoted from its open position toward its closed position in the direction of curved arrows 36, each protruding latch member 36 passes through an accommodating slot-shaped aperture 40 formed in a face plate 41 at the underside of the cover member 14. Once each latch member 36 is through its respective slot the cover assembly 14 is locked and the segment electrode assembly 18 is set in place so that the printing operation as described in the following manner may take place.

As hereinbefore mentioned, mounted behind the cover plate 41 and within the cover member 14, is the rigid mounting board 22 of the segment electrode assembly 18. The rigid mounting board 22 has at least one threaded adjusting screw 42, or the like, affixed thereto in such a manner that the head 44 of the screw 42 engages the latch member 36 when the cover 14 is in the closed position. A lock nut 46 is affixed to the screw 42 so that once the segment electrode assembly 18 is disposed before a stylus board 48 in a manner to provide the best printing relationship the distance between the screw head 44 and the latch member 36 can be set by locking the nut 46. With the adjustment set, the rounded top portion 39 of latch member 36 engages the mounting board 22, on the side of the axis pin 20 opposite from the spring 30, before the cover member 14 is fully closed. The tension exerted by the spring 30 is overcome as the cover member 14 is closed. The force of the latch member 36 against the screw head 44 causes the entire segment electrode assembly 18 to pivot about axis pin 20 toward the facing surface 38 of the main body portion 12.

The stylus board 48 is disposed above the surface 38 so that when the cover member 14 is fully closed, it is positioned below the individual fingers 26 of the segment electrode assembly 18 for an optimum printing relationship. Adjustment of the screw 42 causes the segment electrodes to be disposed substantially perpendicular to the stylus board 48 and the pins thereof. It will be appreciated that slight angular variations from the perpendicular relationship can be critical in electrographic printing. The angle between the segment electrodes and the stylus board 48 can be adjusted to change the angle as necessary, which is of particular use, for example, in compensating for pinholes in the paper and to prevent arcing thereacross which not only distorts the printing but also possibly the printing logic. The stylus board 48, which is best seen in FIG. 3, is canted from the surface 38 of the printer 10 in such a manner that the recording paper 50 carried across the stylus board forms equal angles between the board 48 and the paper, on both sides of the board 48. An advantage to this arrangement will be more fully explained hereinafter.

Stylus boards such as are described in U.S. Pat. Nos. 3,725,950 and 3,771,634 entitled "Electrostatic Printing Apparatus" and "Surface Pattern Stylus Board", respectively, are suitable for operation with the segment electrode assembly 18 of the present disclosure. As hereinbefore mentioned, the segment electrode finger units 26 pivots with the segment assembly 18 to such an extent that the fingers forcefully engage the conductive styli 49 of stylus board 48 when the cover member 14 is fully closed. To accommodate this type of contact the segment finger units 26 are, preferably, thin strips of beryllium copper, as explained hereinbefore. Consequently, and because of the interference intended, the fingers 26 are caused to gently bend when contact with the stylus board 48 is made, and more specifically the recording paper 50 which passes over the stylus board 48. It has been found that by pivoting the segment electrode assembly 18 through an acr of approximately 15°, which is exaggerated in the drawings for illustrative purposes only, from its recessed or open cover position, sufficient pressure can be exerted by the segment finger units 26 against the conductive styli 49 of the stylus board to compensate for any alignment problems which may exist between the segment fingers 26 of the cover 14 and the stylus board 48 of the base 12.

As hereinbefore mentioned and as is obvious, the segment electrode fingers 26 do not make direct contact with the stylus board 48. A length of recording paper 50, as best seen in FIG. 3, is distributed from a paper storage bin, not shown but one such as the type described in pending patent application Ser. No. 625,995 entitled "Electrographic Printer Paper Tensioning Device" filed Oct. 28, 1975 and under common assignment, and thereafter fed over the selectively energized styli 49 at the surface of the stylus board 48.

In loading paper 50, as in the embodiment illustrated, and which is fully illustrated and disclosed in concurrently filed and copending patent application Ser. No. 673,033 entitled "Electrographic Printer Recording Medium Loading Assembly", the cover 14 is opened and a sufficient supply of paper is placed in the storage bin. When the paper supply is depleted, new paper is inserted and a length of the recording paper 50 is drawn up to the area where a paper drive roller 52 and a wrap roller 54 contact each other, as best seen in FIGS. 2 and 3. It will be noted that when the cover 14 is in the up position, as best seen in FIG. 2, and the paper 50 is initially mildly urged between the drive roller 52 and the wrap roller 54. Afterwards, but during the loading process, it is driven farther between the rollers and thereafter exited from slot 55 of cover 14. The wrap roller 54, for instance, may be mounted to a pair of bearing assemblies 56 which in turn would mount at each end to a typical ramp structure 58, formed as part of the cover 14 and which act as bearing surfaces. A pair of springs 60, one of which is shown, extend between a mount 62 on the cover and a stub shaft 64 of the bearing assembly 56 concentric with the wrap roller 54.

As will be appreciated, the type of paper used in the printer 10 can effect the quality of the character printout. Fanfold paper, also referred to as Z-fold, which can be made from rolled paper stock, sometimes has an unacceptable number of pinholes therein. Although pinholes do occur in rolled paper they seem to occur less frequently than in fanfold paper. During operation, when the paper 50 is being fed between the area defined by the segment electrode fingers 26 and the conductive styli surface 49 of the stylus board 48, pinholes in the paper can allow an electrical short to occur between a segment electrode and a stylus electrode. When such a short occurs, an undesirable printout is usually the result. For example, halfing and distortion of characters can happen. Accordingly, a certain degree of adjustability in the angle of the segment electrode 18 to the stylus board 48 has been provided, as hereinbefore mentioned. This adjustment can lessen the chance of electrical shorting between the segment electrode 18 and the stylus electrode 48. As previously mentioned, the angles between the stylus electrode board 48 and the paper 50, on each side of the board, are generally equal. The adjusting screw 42 is provided on the segment assembly 18 so that the angle between the segment electrode fingers 26 and the conductive styli surface 49 of the stylus board 48 can be even more finely adjusted. A reasonable angular displacement from a substantially perpendicular relationship between the segment fingers 26 and the conductive styli surface 49 can be provided by merely moving the adjusting screw either toward or away from the latch member 38. When the desirable distance is found, for example by empirical techniques, the lock nut 46 is secured and that distance effectively remains set. If for any reason, it becomes necessary to reset the distance, a simple manipulation of the adjustment screw 42 is all that is necessary.

For safety of operation as well as for other obvious reasons, the cover 14 should not be opened while the printing process is taking place. A suitable electrical interlock and a latching means, as disclosed herein, for instance, can readily be provided. For example, each of the protruding latch members 36 may have a hooked portion 37 formed thereon which are received in complementing openings 66 of catch members 68 of the cover 14. The catch members 68, for example, may be affixed to the cover member 14 at a pivotable connection 70. Suitable apparatus, such as a typical spring 72, may be used to bias the catch member 68 so that it remains engaged to the hooked portion 37 of the protruding member 36 when the cover 14 is closed. Buttons 74, only one of which is typically illustrated, are arranged to cooperate between the exterior surface 15 of the cover member 14 and the catch member 68. By pushing the buttons 74, the force of each spring 72 is overcome and the catch member 68 is caused to pivot at the pivotable connection 70, thereby releasing it from the hooked portion 37 of the protruding member 36. The cover 14 can then be opened. In the disclosed configuration the cover 14 can only be opened by design and not by accident. A spring such as spring 30, or other suitable means, can be mounted to the electrographic printer base 12, or to the cover 14 thereof so that when the buttons 74 are pressed to release latch 68, the cover is forced upwardly a small amount. This aids the operator in opening the cover to load or inspect the printer.

An electrical switch, not shown, could, for instance, be incorporated into the cover 14 to cooperate with the catch member 68 so that when the catch member is released from the hooked portion 37 of the protruding member 36, all high voltage electrical energy is shut off to operational apparatus inside the cover. Any potential for injury, which could be caused to a person who accidentally contacts some electrical area, is thereby eliminated. Such an interlock prevents electrical energy from being supplied to the assembly within the cover 14 unless the cover is closed. Consequently, the possibility of a person receiving an electrical shock is greatly reduced.

A preferred embodiment of the invention, has been shown and described, but it should be obvious to any skilled in the art that various modifications and/or changes can be made thereto without departing from the spirit or scope of the invention as claimed therein.

It is claimed:

1. An electrographic segment electrode mounting assembly supportable in a cover for a base of an electrographic printer to dispose electrographic electrodes in a first protected and inoperative position when the printer cover is open and in a second operative position when the printer cover is closed with respect to the base of the printer, comprising:
   a segment electrode assembly;
   support means pivotable about a fixed axis for mounting the segment electrode assembly to an electrographic printer cover movable between an open position and a closed position;
   frame means for encompassing the segment electrode assembly in a first protected and inoperative position when the cover is open;
   biasing means cooperatively mounted between the segment electrode assembly and the electrographic printer cover to maintain the segment electrode assembly in the first protected and inoperative position when the cover is open; and
   actuating means for moving the segment electrode assembly from the first protected and inoperative position to the second operative position when the cover is closed.

2. The segment electrode mounting assembly as defined in claim 1, wherein the segment electrode assembly includes a plurality of resilient elongated extensions each operative as an electrographic segment electrode.

3. The segment electrode mounting assembly as defined in claim 1, wherein the support means for mounting the segment electrode assembly to the cover of the electrographic printer is disposed for mounting the segment electrode assembly at the undersurface of the electrographic printer cover.

4. The apparatus as defined in claim 1, wherein the actuating means includes a latching mechanism for securing the printer cover in the closed position.

5. The segment electrode mounting assembly as defined in claim 1, wherein the support means includes adjustment means disposed for adjusting the angular printing alignment of the segment electrode assembly when the actuating means moves the segment electrode assembly to the operative position when the cover is closed.

6. The segment electrode mounting assembly as defined in claim 5, wherein said segment electrode adjustment means is an adjustable screw.

7. The segment electrode mounting assembly as defined in claim 5, wherein the names for providing angular adjustment is disposed on the support means to contact the actuating means when the printer cover is in a closed position.

8. The segment electrode mounting assembly as defined in claim 7, wherein the means for providing angular adjustment comprises an adjustable screw affixed to the support means.

9. An electrographic segment electrode mounting assembly supportable in a cover for a base of an electrographic printer to dispose electrographic electrodes in a first protected and inoperative position when the printer cover is open and in a second operative position when the printer cover is closed with respect to the base of the printer, comprising:
   a segment electrode assembly including a plurality of elongated extensions;
   support means for mounting the segment electrode assembly to an electrographic printer cover movable between an open position and a closed position;
   a structure of walls affixed to the cover and surrounding the periphery defined by the segment electrode elongated extensions for encompassing the segment electrode assembly in a first protected and inoperative position when the printer cover is open; and
   actuating means for contacting and moving the segment electrode assembly from the first protected and inoperative position to the second operative position when the cover is closed.

10. The segment electrode mounting assembly as defined in claim 9, further including biasing means for disposing the segment electrode assembly within the wall structure surrounding the segment electrode elongated extensions.

11. The segment electrode mounting assembly as defined in claim 10, wherein the biasing means is a spring affixed to the support means to pivot the segment electrode assembly to dispose the electrode assembly within the frame means when the printer cover is open.

12. The apparatus as defined in claim 10, wherein said biasing means is at least one resilient member mounted between the segment electrode assembly and the cover.

* * * * *